(12) United States Patent
Gilboy (10) Patent No.: US 8,471,682 B1
(45) Date of Patent: Jun. 25, 2013

(54) METHOD AND SYSTEM FOR DETERMINING ASSET DISPOSITION USING RFID

(75) Inventor: Christopher Gilboy, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1113 days.

(21) Appl. No.: 11/322,016

(22) Filed: Dec. 29, 2005

(51) Int. Cl.
 *G08B 1/08* (2006.01)
(52) U.S. Cl.
 USPC ...................................... 340/10.4; 340/539.1
(58) Field of Classification Search
 USPC .............. 340/10.4, 40.41, 572.1, 539.1, 10.1, 340/539.22; 235/375, 492
 See application file for complete search history.

(56) References Cited

U.S. PATENT DOCUMENTS

| | | | |
|---|---|---|---|
| 5,745,049 A * | 4/1998 | Akiyama et al. | ......... 340/870.17 |
| 6,177,860 B1 | 1/2001 | Cromer et al. | |
| 6,249,227 B1 * | 6/2001 | Brady et al. | ................ 340/572.1 |
| 6,796,506 B1 | 9/2004 | Pradhan et al. | |
| 7,219,834 B2 * | 5/2007 | Chang | ........................... 235/380 |
| 7,274,291 B2 * | 9/2007 | Shaffer et al. | ............ 340/539.26 |
| 2005/0231320 A1 * | 10/2005 | Ackermann | ................... 337/206 |
| 2007/0001837 A1 * | 1/2007 | Larson et al. | ............... 340/539.1 |

* cited by examiner

*Primary Examiner* — Nabil Syed

(57) ABSTRACT

A system and method of determining a disposition of an electronic device as installed, in-need-of-repair, or in-storage are provided, using Radio Frequency Identification (RFID) devices on the electronic devices and a sensor which detects disposition. Diagnostic test results and locations of installed devices may also be communicated to the RFID associated with the device and provided in a response to an interrogation. Shared memory on the device is integrated with the RFID device to store utilization and health history on the device for later retrieval. The disposition data is provided in a response to an interrogation of each device. Optionally, a communications device (e.g., RFID, or wireless interconnection) on a chassis housing electronic devices provides the disposition and location of all installed devices in response to an interrogation. The device disposition and location information is communicated to the communications device upon installation via a processing unit integral to the chassis.

19 Claims, 7 Drawing Sheets

METHOD AND SYSTEM FOR DETERMINING ASSET DISPOSITION USING RFID

FIELD OF THE INVENTION

The present invention relates to tracking inventory using sensors, and particularly, to a method and system for determining the location and disposition of electronic devices within a zone using RFID tags.

BACKGROUND OF THE INVENTION

Currently, Radio Frequency Identification (RFID) systems are being used in various industries to keep stock of items in inventory that are marked with identifying sensors or so-called Radio Frequency (RF) tags. Such systems typically include several RF transmitters placed in locations of interest. An RF tag is placed on each inventory item. The vendor can then successfully track inventory by identifying the presence or absence of an item in a particular location through its RFID tag. By appropriate placement of the RF transmitters, the location of each tagged item is then determined. This conventional system works especially well for inventory items in transit as they are shipped from location to location. RF transmitters appropriately placed, for example, on loading docks, inside a truck, or inside a warehouse can be used to track the status of a tagged item upon purchase to its final designation.

In industries that utilize electronic devices, particularly network service industries, tracking electronic device inventory can be more troublesome due in part to the proximity of the items being tracked. In the telecommunications industry, for example, electronic devices for each node in a network may be installed in adjacent bays or chassis on an equipment rack (frame). Devices that may housed in the same network node include servers, network switches/routers, multiplexers, optical-to-electrical (O/E) converters, and circuit packs. In some cases, it is also desirable to track many of the electronic components within each of these electronic devices, e.g., processors, controllers, memory chips, and the like. The network node itself may occupy a building, or one floor of a building. It is desirable to track not only the location of each device within the network node, but also its disposition in order to distinguish items being stored on a shelf from those which are installed and in use.

It is known that the disposition of an electronic device can be inferred by appropriate placement of an RF transmitter on an equipment rack or live chassis. If the presence of an RF tag associated with a particular electronic device is detected, it is assumed that the device is installed and in use.

In particular, solutions to the problem have been attempted and described in related art, for example, in U.S. Pat. No. 6,847,856 to Bohannon. The Bohannon patent uses multiple sensor pairs to determine the juxtaposition or relative alignment between inventory components. By carefully tracking the physical location of cables using properly placed transmitters and tags, the method determines physical connections between the cables and device ports. Electrical connectivity itself, however, is never verified, but only inferred from the tracked physical locations.

U.S. Pat. No. 6,796,506 to Pradhan, et al., determines the particular location of each tagged electronic device on an equipment rack using a large number of sensors that require careful reader-to-tag alignment. An RF transmitter is placed on each bay of the rack and detects the ID of the tag corresponding to the electronic device installed in the bay. Because the physical location of each transmitter is known, the location of the corresponding electronic device it detects is also known.

Both these schemes can only infer disposition of the tagged devices and do not verify electrical connectivity of the electronic device with the live chassis. In addition, both methods require a large number of carefully aligned sensors in order to detect the location of electronic devices at the rack level. Such an arrangement increases cost due to the large number of sensors required, as well as the cost of installation and continual upkeep.

Because of these costs, the physical location and disposition of electronic devices within a data center or network node are still most commonly determined by manual inventory checks.

There is a need, therefore, particularly in the telecommunications industry, for a method and system for determining the location and disposition of electronic devices within an area in which installed devices are in close proximity to shelved items, such as in a network node.

SUMMARY OF THE INVENTION

The present invention, which addresses the needs of the prior art, provides a method of determining the disposition of an item, the item being associated with a Radio Frequency Identification (RFID) device and identification information, which includes transmitting an interrogation, and receiving a response from the RFID device in response to the interrogation. The response includes disposition information and identification information associated with the item. The disposition information is obtained using a sensor associated with the item.

The item may be an electronic device, and the identification information may include an identification number (ID). The disposition may be associated with at least one operational state of the electronic device. The method may further include determining the operational state in response to transmitting, and the operational state of an installed electronic device may include an installed state. The operational state may further include one of an in-use state and an in-need-of-repair state, and the method may further include performing a diagnostic test of the installed electronic device. The operational state may be determined to include one of the in-use state of the electronic device upon successful completion of the diagnostic test and the in-need-of-repair state upon failed completion of the diagnostic test in response to performing. Performing may be initiated in response to transmitting.

Performing may be conducted upon at least one of initial start-up and at intervals. The method may include storing the disposition information, the corresponding ID from the RFID device, and a date when the receiving was performed. The method may also include providing details of the failed completion of the diagnostic test in the response, and automatically reporting the details of the failed completion of the diagnostic test to a technician for repair. The at least one operational state may include at least one of an in-use state, an in-need-of-repair state, and an in-storage state, and the method may include manually setting the electronic device to the in-need-of-repair state in response to determining the electronic device needs repair. Determining may include determining the at least one operational state to be the in-storage state in response to the disposition not including the installed state, the in-use state, or the in-need-of-repair state. The method may also include retrieving a location and the ID of the installed electronic device in response to transmitting, wherein the location includes at least one of a chassis, bay, shelf, and slot in which the installed electronic device is located.

The method may also include storing information including the location and the ID of the installed electronic device in memory provided on the installed electronic device, and at least one of a date and time of each installation, a current version of software/firmware, a number of ports used, a record of service history, utilization, and operational status of the installed electronic device, and retrieving the stored information in response to a specific interrogating request for the stored information. The item may be an electronic device that resides in a chassis, which includes a processing unit and a communications device capable of sharing information with the processing unit.

The method may further include relaying the ID, disposition information including at least one operational state of the electronic device, and location of the electronic device to the processing unit in response to installing the electronic device in the chassis, wherein the at least one operational state is determined from the sensor to include at least one of an installed state, an in-use state, and an in-need-of-repair state. The location may include at least one of a chassis, bay, shelf, and slot in which the installed electronic device is located; transmitting a second interrogation to the communications device; and receiving a second response from the communications device comprising the ID, disposition, and location of the installed electronic device obtained from the processing unit in response to transmitting. The communications device may include one of an RFID device, a wired or wireless communications device, and an Operations Support Systems device. The communicating step may be implemented using shared memory to communicate between the communications device and the processing unit.

The present invention also provides a system for determining disposition of an electronic device, which includes a Radio Frequency Identification (RFID) device and identification information associated with the electronic device, a sensor associated with the electronic device for recognizing at least one operational state associated with the disposition of the electronic device, and a base station comprising an interrogator for collecting from the corresponding RFID device the identification information and disposition information associated with the electronic device. The operational state of an installed electronic device may include an installed state. The system may include a computer operatively connected to the interrogator for storing information including at least one of a location and corresponding ID of the electronic device, a date and time of an installation, a current version of software/firmware, a number of ports used, a record of service history, utilization, and the disposition information. The location of an installed electronic device may include at least one of a chassis, bay, shelf, and slot of the installed electronic device.

The RFID device and the sensor may be integrated into the electronic device, and the electronic device may include a processing unit, shared memory, and component memory. The asset information may be shared between the sensor and the processing unit using the shared memory, and the component memory may include stored asset information and historical data for future retrieval.

The present invention further provides a system for determining a disposition and location of a plurality of electronic devices, which includes a Radio Frequency Identification (RFID) device including an ID associated with each electronic device, a sensor associated with each electronic device for determining the disposition of the corresponding electronic device, a base station comprising an interrogating device, a processing unit located on a chassis housing installed electronic devices, and a communications device associated with the chassis.

The communications device is configured to receive the corresponding IDs and locations of the installed electronic devices from the processing unit for transmission to the base station. The processing unit is operatively connected to the sensor of each installed electronic device for detection of the installed electronic devices. The communications device may be one of a wired interconnection with the base station, a wireless interconnection with the base station, an RFID device communicating through the interrogator, and an Operations Support System. The interrogating device may be configured to receive a response from each RFID device in response to an interrogation, and the response may include at least the ID associated with each electronic device. The disposition of the RFID device as not including an installed state may include one of an in-storage state and an in-need-of-repair state. The in-need-of-repair state may be provided by one of a manual switch and a response to a failed completion of a diagnostic test of one of the installed electronic devices.

Thus, the present invention, which addresses the needs of the prior art, provides a method and system for determining the disposition and, optionally, location of items in inventory, particularly electronic devices, within an area in which devices, which are in use, are in close proximity to shelved items, such as in a network node.

Further, the present invention provides a system and method for determining the disposition, as well as location of electronic devices within an area in which installed devices are in close proximity to shelved items, such as in a network node.

Other objects and features of the present invention will become apparent from the following detailed description considered in conjunction with the accompanying drawings. It is to be understood, however, that the drawings are designed as an illustration only and not as a definition of the limits of the invention.

DETAILED DESCRIPTION OF THE PREFERRED EMBODIMENTS

The present invention provides an improved method and system for determining the location and disposition of inventory items, particularly, electronic devices, within an area in which installed and in-use devices are in close proximity to shelved items, such as in a network node. Though the examples provided herein are directed to a system and method for use in a node of a telecommunications network, one skilled in the art will appreciate that the method and system may be readily applied to any industry requiring tracking the disposition and location of proximately located in-use and stored inventory items. The invention is particularly useful to service industries with inventory including electronic devices.

In particular, there is a need in a telecommunications network to determine the disposition of assets within a network node. A network node, as used herein, refers to a physical location of all equipment required to deliver the particular telecommunications services provided by the node. Typically, the network node is a dedicated building. In some cases, the node may occupy a section or one or more floors of a building. The equipment located within the network node includes electronic devices that are in use, extra devices in stock and shelved in cabinets for future use, for example, and those in need of repair.

In accordance with the present invention, the recognizable dispositions or operational states of an electronic device located within a network service node preferably include at least an "installed" state, and an "in-storage" state. One or both of a "in-need-of-repair" state, and an "in-use" state are also preferably provided.

An electronic device in the "installed" state has been installed in a bay or chassis of the equipment rack and established electrical connectivity to the "system" via the back panel of a live chassis or via cable. Thus, in the installed state, the electronic device is properly installed and connected.

The terms "bay", "chassis", and "frame" are used interchangeably herein to refer to any type of housing into which an electronic device or card can be installed, and which provide power to the installed electronic device.

An electronic device in the "in-use" state as used herein is in an "installed" state and has also passed initial diagnostic testing upon start-up to verify that it is in working order. Therefore, an "in-use" device is properly installed and providing service.

An electronic device in an "in-need-of-repair" state is, obviously, a device identified as defective or broken. In one embodiment, such a device may be in an "installed" state, but is not in an "in-use" state because it failed the start-up test. In a second embodiment, a device may be placed in an "in-need-of-repair" state, for example, by manually activating a switch to enable the "in-need-of-repair" state. Accordingly, an "in-need-of-repair" state may include a broken or defective electronic device that has been placed on a shelf.

An electronic device in the "in-storage" state is one that is being stored as extra inventory on a cabinet shelf, for example, and which has not been placed in an in-need-of-repair state.

Figure 1:
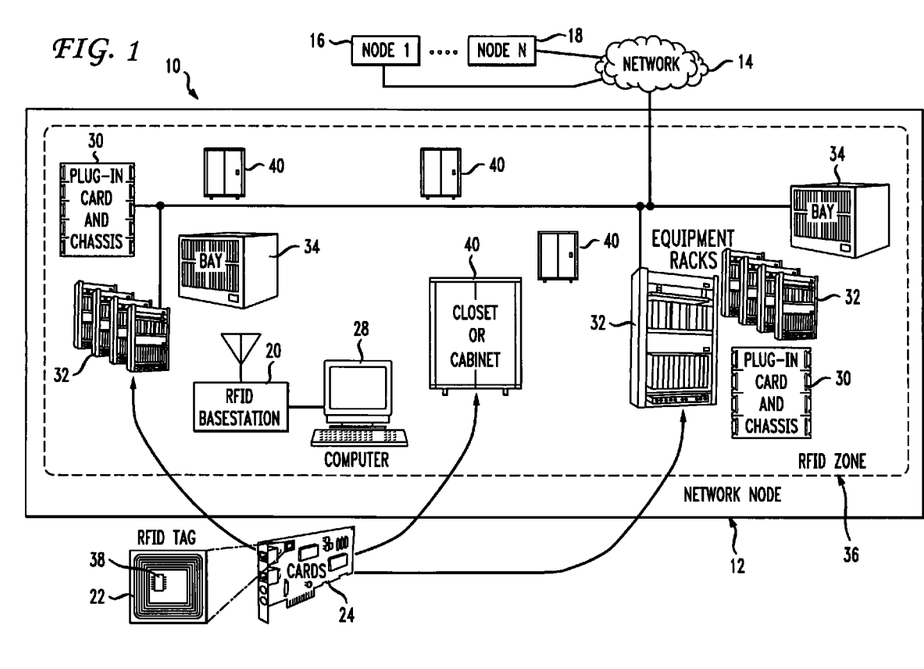
FIG. 1 is a block diagram of a system for implementing a method of determining a disposition and location of electronic devices located within a network node.

A system 10 for implementing the method formed in accordance with the present invention in a node 12 of a network supply chain 14 is shown in FIG. 1. The network 14 itself consists of many nodes (Node 1 16 through Node N 18) placed at various geographical locations. Each node 12 may contain any combination of switches, routers, multiplexers, and other equipment used to deliver various telecommunications services, such as voice and data services. The node 12 may provide wired and/or wireless services.

The system 10 includes an interrogator (or base station) 20 and a Radio Frequency Identification (RFID) tag 22 associated with each electronic device 24. The system 10 also preferably includes a computer 28 for processing and storing at least an identification, location, disposition and historical data for each electronic device 24 in inventory.

Electronic devices 24 to be tracked in the network node 12 include circuit packs, commonly referred to as "plug-in cards" or simply "cards." The term "card" is therefore used interchangeably with "electronic device" to refer to any electronic device in need of tracking. Each device 24, as well as any other piece of equipment in the node 12 which one desires to track, is preferably equipped with a Radio Frequency (RF) tag 22.

In one embodiment, any enclosure in which devices 24 are either installed or stored is also preferably equipped with a tag 22, such as chassis 30, frames or equipment racks 32 or bays 34.

The inherent range of transmission of the interrogator 20 establishes an RFID zone 36 within the network node 12. All tagged devices and enclosures must reside within the zone 36 in order to be interrogated. The zone 36 overlaps at least that part of the network node 12 that houses all of the inventory and enclosures which are tagged and in need of tracking. According to the present invention, the base station or interrogator 20 controlling the zone 36 may be any suitable RF interrogator known in the art. Accordingly, the interrogator 20 includes an RF antenna with suitable range and frequency for periodically communicating with or interrogating any RFID tags 22 within the zone 36.

The RF tag 22 may be a passive RF device that simply modulates a received interrogating RF signal and returns the modulated signal to the interrogator 20, or an active RF transponder that generates its own signal in response to receiving the interrogating RF signal. In either case, as is well known in the art, the modulation is used to transmit information about the corresponding device 24 from the tag 22 to the base station 20.

A sensor 38 is associated with each device 24 which determines the disposition of the device 24, including whether the device 24 is installed, e.g., whether it is properly plugged into the corresponding live chassis 30. The sensor 38 may be any sensor known to those skilled in the art for detection of an electronic connection between a device 24 such as a plug-in card and chassis 30 or bay 34, such as those used for in "plug and play" technology for detecting the presence of new hardware.

The sensor 38 may, for example, be either a solid-state or optical coupler. In one embodiment, the sensor 38 may be operatively, e.g., magnetically, coupled to a signal path or paths on the card 24 such that the presence of current and/or a magnetic field triggers the sensor 38. For example, when a card is plugged into a chassis 30, the backplane of the chassis provides power to the card 24. The detection of power on the card 24 is an indication that the card 24 is plugged in and thus, in an "in use" state.

The base station 20 is operatively connected to the computer 28, optionally remotely via a network connection, so that interrogation information may be stored and retrieved for later use. Software installed on the computer 28 provides user interface with the system 10. The software preferably incorporates collision algorithms well-known to those of ordinary skill in the art to control the communications received from the plurality of tags 22.

The electronic devices or components 24 that are installed and in use supporting network traffic, for example, are plugged into a live network chassis 30, for example, in the node 12 which, in turn, is connected to other nodes in a wide network 14. Unused or "spare" replacement components in a network node are preferably stored within close proximity of the "live" network equipment for convenient and quick availability. The spares may be stored in any typical storage enclosure 40, including closets, cabinets, shelves, or storage bins. Though convenient, this close proximity has hampered the determination of asset disposition using conventional RFID methods and systems.

Figure 2:
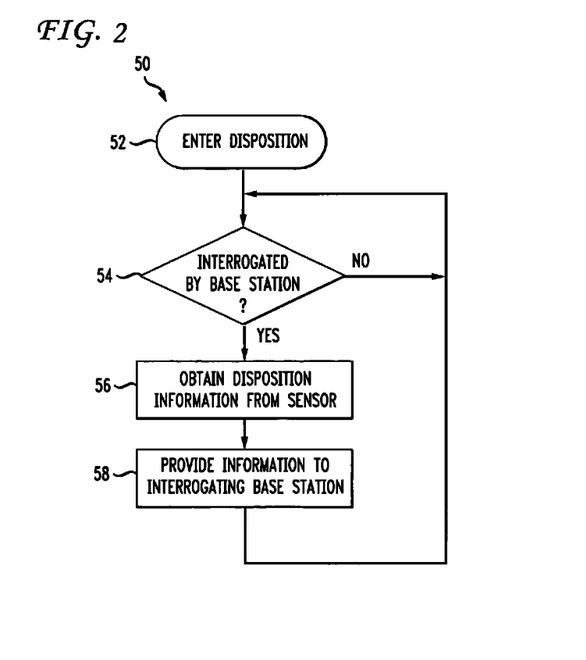
FIG. 2 is a flow diagram of an embodiment of a method of determining a disposition and location of electronic devices using the system of FIG. 1.

Referring to FIG. 2, as well as FIG. 1 one embodiment of a method 50 of the present invention for determining a disposition and location of each electronic device 24 located within the zone 36 includes identifying each electronic device 24 which is installed within the zone 36.

Using the system 10 described above, a simple asset disposition response is preferably obtained indicating whether the electronic device or card 24 is installed as follows. As described above, each component's RFID tag 22 is associated with a sensor 38 that is used to detect whether the card 24 is plugged into a live chassis 30, for example. The detection of power on the card 24 using a suitable sensor 38, as known to those skilled in the art, provides an indication that the card 24 is plugged in and thus, "installed." The sensor 38 provides 52 a signal to the RFID tag 22 indicating the card 24 is plugged in. The RFID tag 22 is then interrogated 54 by the RFID base station 20, which collects 56 identifying information (ID) from each device 24 which is installed. The RFID base station 20, therefore, gains and preferably stores 58 the RFIDs of installed devices. By polling or interrogating all RFID tags 22 within the zone 36, a complete list of electronic devices in the network node is also compiled. Any device 24 for which a signal is collected which does not indicate that it is installed, if no other information is provided, is assumed to be in storage (in an in-storage state) and ready for use. By periodic polling, the RFID base station 20 can request and maintain asset history by maintaining a record of use of each device 24.

According to this method, each tag 22 waits until it is interrogated by the base station 20. When the tag 22 is interrogated, the corresponding sensor information is included in the RFID tag response signal to the base station 20. The sensor response information could be very simple. For example, in Boolean logic terms, a digital status code of "00" might mean that no magnetic coupling was detected and thus, the card is not installed for use. In that case, the next tag 22 is interrogated. Conversely, a digital status code of "01" could mean that magnetic coupling was detected, indicating the card 24 is installed. If no other status indicator, i.e., no repair code is indicated, then the digital code of 00 will refer to a card 24 that is simply in storage and ready for use. If the tag is installed, the disposition is collected 56 from the sensor 38 and communicated 58 to the base station 20.

In another embodiment of the method of the present invention, the health of each installed electronic device 24 may also be acquired as follows. Each card 24 preferably contains a diagnostic check that can be performed to ascertain its health, in accordance with means well-known to those skilled in the art. The method includes performing the diagnostic test at least upon start-up and preferably also periodically at pre-set intervals. The method further includes collecting 56 the results of the diagnostic test of the installed device via the RF tag 22 when polled by the interrogator 20.

Alternatively, when the card 24 is interrogated, it initiates the diagnostics and reports the results back to the base station 20 upon completion of the diagnostics. The signal collected 56 by the interrogator 20 in response to polling will include a code indicating whether the card 24 is healthy or, equivalently, in an "in use" state as defined herein. For example, whereas the simple digital code of "01" could mean the card is "installed", a card which is installed and healthy, or "in use" may be indicated by a "11". If the card 24 is installed but did not pass the diagnostic test, preferably another code is supplied, e.g., "10" indicating a card 24 that is in need of repair. Optionally, a more detailed code is provided to the interrogator 20 to describe the specific failure detected.

In another embodiment, the RFID card supports a physical switch or push button that allows a technician to set the card's operational state or status. For example, if a card 24 is not functioning properly, the technician sets the card status to "in-need-of-repair." Upon interrogation, the base station learns of the card's condition. In a further embodiment, the condition of the card 24 and indicated repair procedures are preferably automatically communicated to an appropriate technician.

Figure 3:
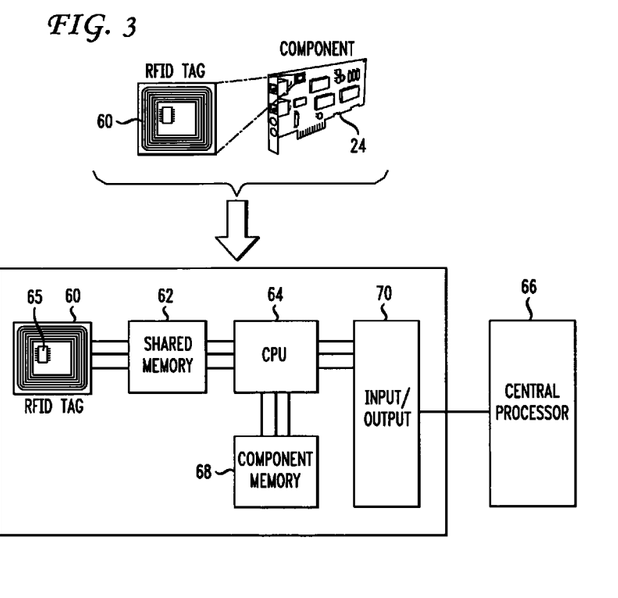
FIG. 3 is a block diagram of an embodiment of an integrated RFID device formed in accordance with the present invention.

Referring to FIG. 3, an additional embodiment of the system 10 of FIG. 1 includes an RFID tag 60, preferably an active RFID transponder, which is integrated into the card 24 itself such that a tighter coupling is achieved. Toward that end, additional features are associated with each tag 60. In particular, shared (a.k.a. "dual port"), nonvolatile memory 62 is preferably used so that the RFID transponder 60 and the component central processing unit (CPU) 64 associated with the device 24 preferably can share asset information. A sensor 65 for recognizing disposition including at least whether the card is installed is associated with the card 24 and may be integrated into the RFID device 60, the card 24, or on a chassis into which the card 24 is installed, for example. For example, when a card 24 is inserted into a frame or chassis, an initialization sequence (referred to as "booting up") occurs automatically. During this initialization, the CPU 64 on the newly installed card communicates with a central processor 66 to receive configuration information. The central processor 66 may reside on the chassis 30 in which the card 24 is installed or in a device which communicates with the card 24. After this exchange occurs, the card's CPU 64 can record detailed disposition information in its memory 68, such as the bay, shelf, or slot number that the component 24 is plugged into. Because of the shared memory 62 feature, other historical information such as the date and time of install, the current version of firmware/software, number of ports used, the history of utilization of the card and card health information may also be stored in memory for future access over the input/output bus 70.

Figure 4:
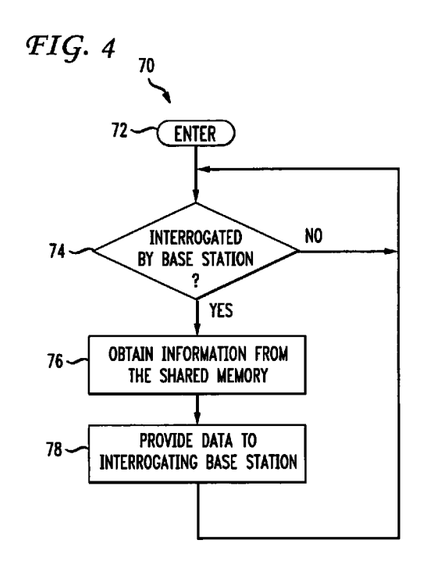
FIG. 4 is a flow diagram of an embodiment of a method of determining a disposition and location of electronic devices using the integrated RFID device of FIG. 3.

Referring to FIG. 4, another embodiment of the method 70 of the present invention additionally includes generating the information (e.g., disposition and/or historical), storing the information on the card 24, and retrieving the information or data via the integrated RFID tag 60. Various items of historical data are periodically generated and stored 72 in component memory 68. The tag 60 waits until it is interrogated by the base station 20. In response to being interrogated 74, if it is present, the tag 60 collects 76 the data stored in the component memory 68 via the shared memory 62 and communicates 78 the data to the base station 20.

Figure 5:
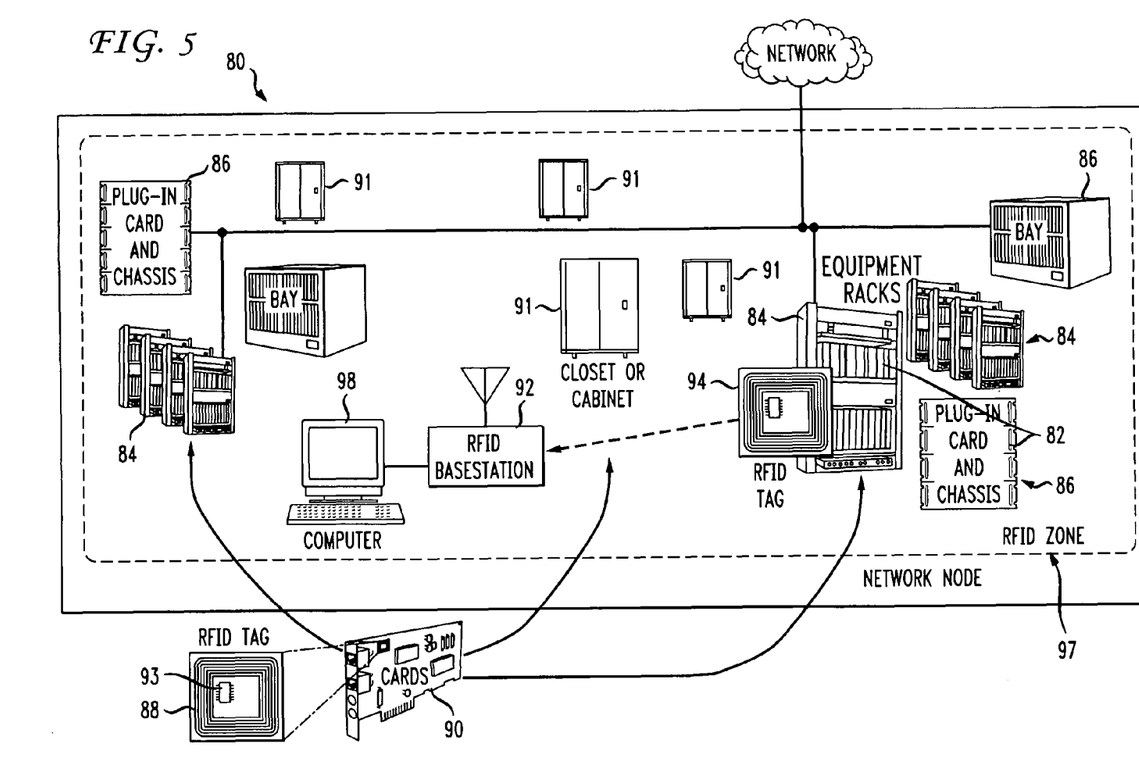
FIG. 5 is a block diagram of another embodiment of a system for determining a disposition and location of electronic devices formed in accordance with the present invention.

FIG. 5 shows a further embodiment of a system 80 for implementing a method formed in accordance with the present invention. The system 80 includes a central processor 82 associated with each frame 84 or chassis 86. An RFID tag 88, preferably an active RFID transponder, is provided on each electronic device 90 and on each enclosure which houses such devices 90, including storage cabinets 91 and frames or live chassis 86. The processor 82 may be local or may communicate remotely with each RFID tag 88. In either case, each processor 82 recognizes (and records) the RFID of each of the "installed" cards, according to methods known in the art. Each tag 88 and device 90 is associated with a sensor 93 for sensing the disposition of the card 90, e.g., as installed. In this embodiment, the central processor 82 receives disposition information from informational exchange among all of the enclosed cards 90 via a chassis or frame backplane. The RFID tags 88 installed on each device or card 90 do not communicate this disposition directly to the base station, but rather the information is reported to the chassis transponder 88 or other communications device associated with the chassis for reporting to the base station 92.

Figure 6:
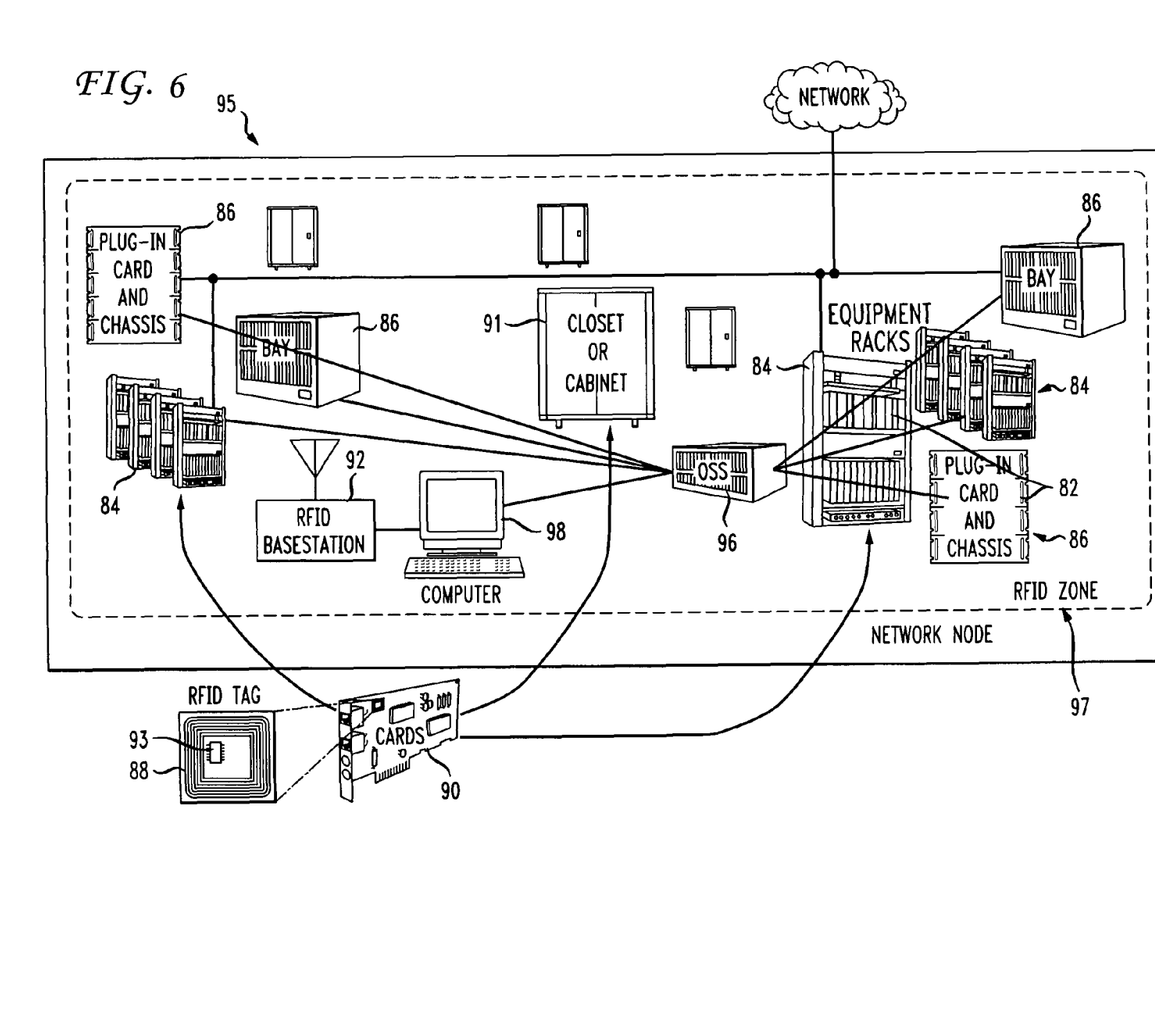
FIG. 6 is a block diagram of yet another embodiment of a system for determining a disposition and location of electronic devices formed in accordance with the present invention.

According to a method of the present invention, the central processor 82 reports this information to an RFID base station 92 in response to an interrogating step. This reporting is preferably accomplished using a special RFID transponder 94 included on the chassis, preferably via shared memory as depicted in FIG. 5. Alternatively, the frame or chassis 86 can report this information using a different communications device such as a wired or wireless interconnection. Referring to FIG. 6, as another alternative, a system 95 may include an OSS (Operations Support System) 96 in place of the tag 94 for reporting the information from each processor 82 to the base station 92. As is known to those skilled in the art, an OSS is an umbrella term for a set of programs that provide support, such as monitoring, analysis, data collection, and so on, to a communications network, but which is not involved with the main network function of transmitting and switching data.

Referring to FIGS. 5 and 6, an embodiment of the method of the present invention includes retrieving from the central processor 82 of each frame or chassis 86 a list of which cards 90 in inventory are "installed" in each chassis. Initially, the base station 92 acquires a record of the full set of electronic devices 90 within the zone 97 through traditional RFID polling of the RFID tags 88 installed on the cards 90. Preferably, the list of devices with associated RFIDs is saved on a computer 98. Therefore, the base station 92/computer 98 can discern which cards 90 are in inventory "spare" or "in-storage" and waiting to be used by comparing the full list with the installed list acquired from each processor 82.

Figure 7:
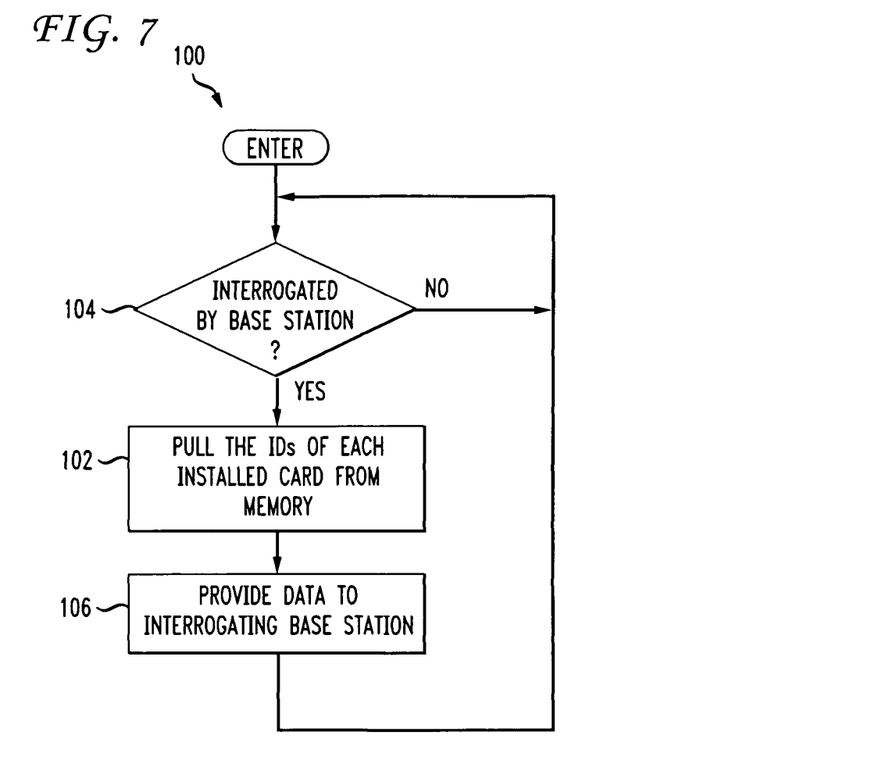
FIG. 7 is a flow diagram of a method of determining a disposition and location of electronic devices using the system of FIG. 5.

Optionally, devices 90 in need of repair can also be identified according to the method described above, where the cards in an "in-need-of-repair" state are so indicated either by manually setting the in-need-of-repair state and/or by initiating diagnostic tests on the installed devices to verify whether such devices are, in fact, operational. Referring to FIG. 7, a method 100 of determining the disposition and location of devices 90 according to the system 80 of FIG. 5, includes pulling 102 the RFIDs of each installed card from the communications device (RFID transponder 94 or, OSS 96, e.g. on each chassis 82) in response to an interrogation 104 by the base station 92. Preferably, when each chassis RFID tag 94 is interrogated, the corresponding central processor 82 collects all of the IDs of circuit cards installed within the chassis and provides 106 that set via shared memory to the communications device or transponder 94. The list is then communicated to the base station 92.

Though the system and method of the present invention are described herein with reference to the tracking of inventory within a zone that represents a node in a telecommunications network, it will be appreciated by those skilled in the art that the invention is not limited thereto. The present invention is applicable to tracking any type of inventory to determine the disposition and, optionally, the location of such devices.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. A method of determining a disposition of an item, comprising:
transmitting, by an interrogating device, an interrogation;
receiving, by the interrogating device, a response from a radio frequency identification device in response to the interrogation, the response comprising disposition information and identification information associated with the item, wherein the item is an electronic device comprising a circuit pack of a node in a telecommunication network, the disposition information being obtained by the radio frequency identification device from a sensor that is operatively monitoring a signal path of the circuit pack for detecting a presence of a magnetic field, wherein the identification information comprises an identification number, the disposition information being associated with an operational state of the electronic device, wherein the operational state indicates whether the electronic device is in an installed state; and
wherein, when the operational state indicates that the electronic device is in the installed state, the operational state further indicates whether the electronic device is in one of two possible states comprising: an in-use state or in a need-of-repair state.

2. The method of claim 1, wherein a diagnostic test is initiated in response to the transmitting the interrogation when the operational state indicates the electronic device is in the installed state to distinguish whether the electronic device is in one of the two possible states.

3. The method of claim 1, further comprising:
storing the disposition information, the identification number from the radio frequency identification device, and a date when the response is received.

4. The method of claim 2, further comprising:
providing details of a failed completion of the diagnostic test in the response.

5. The method of claim 4, further comprising:
automatically reporting the details of the failed completion of the diagnostic test to a technician.

6. The method of claim 1, wherein the operational state further includes an in-storage state to indicate that the electronic device has not been installed.

7. The method of claim 1,
wherein a location of the electronic device is retrieved, if the operational state of the electronic device is in the installed state, in response to the transmitting the interrogation, wherein the location includes at least one of: a chassis, a bay, a shelf, and a slot in which the electronic device is located.

8. The method of claim 7,
wherein information comprising the location and the identification number is stored in a memory provided on the electronic device, if the operational state of the electronic device is in the installed state, and wherein the information that is stored further comprises at least one of: a date as to when the electronic device was installed, a time as to when the electronic device was installed, a current version of a software loaded on the electronic device, a current version of a firmware loaded on the electronic device, a number of ports used on the electronic device, a record of service history on the electronic device, a measure of utilization of the electronic device, and the operational state of the electronic device.

9. The method of claim 1, wherein the item resides in a chassis, the chassis comprising a processing unit and a communications device capable of sharing information from the processing unit, the method further comprising:

relaying the identification number, disposition information including the operational state of the electronic device, and a location of the electronic device to the processing unit in response to installing the electronic device in the chassis, the operational state being determined from the sensor, wherein the location includes at least one of: a chassis, a bay, a shelf, and a slot in which the electronic device is located;

transmitting a second interrogation to the communications device; and receiving a second response from the communications device comprising the identification number, the disposition information, and the location of the electronic device, wherein the second response is obtained from the processing unit in response to the transmitting the second interrogation.

10. The method of claim 9, wherein the communications device comprises a radio frequency identification device.

11. The method of claim 9, wherein the relaying is implemented using a shared memory to communicate between the communications device and the processing unit.

12. A system for determining a disposition of an electronic device, comprising:

a radio frequency identification device for communicating identification information and the disposition associated with the electronic device, wherein the electronic device comprises a circuit pack of a node in a telecommunication network;

a sensor operatively monitoring a signal path of the circuit pack for detecting a presence of a magnetic field, the sensor for recognizing an operational state of the electronic device associated with the disposition of the electronic device, the operational state of the electronic device including an installed state, the recognizing of the operational state further distinguishing whether the electronic device in the installed state is in one of two possible states comprising: an in-use state and an in-need-of-repair state; and a base station comprising an interrogator for collecting from the radio frequency identification device the identification information and the disposition associated with the electronic device.

13. The system of claim 12, further comprising a computer operatively connected to the base station for storing information including at least one of: a location of the electronic device, an identification number of the electronic device, a date as to when the electronic device was installed, a time as to when the electronic device was installed, a current version of software loaded on the electronic device, a current version of firmware loaded on the electronic device, a number of ports used on the electronic device, a record of service history on the electronic device, a measure of utilization of the electronic device, and the disposition, and wherein the location of the electronic device includes at least one of: a chassis, a bay, a shelf, and a slot of the electronic device.

14. The system of claim 12, wherein the radio frequency identification device and the sensor are integrated into the electronic device, the electronic device comprising a processing unit, a shared memory, and a component memory, wherein asset information is shared between the sensor and the processing unit using the shared memory, and wherein the component memory comprises asset information that is stored and historical data for future retrieval.

15. The method of claim 1, further comprising:
manually setting an electronic device to the in-need-of-repair state in response to determining that the electronic device needs repair.

16. The method of claim 9, wherein the communications device comprises a wired communications device.

17. The method of claim 9, wherein the communications device comprises a wireless communications device.

18. The method of claim 9, wherein the communications device comprises an operations support systems device.

19. An apparatus for determining a disposition of an item, comprising:

a processor; and a computer-readable medium in communication with the processor, storing a plurality of instructions which, when executed by the processor, cause the processor to perform operations, the operations comprising:

transmitting an interrogation;

receiving a response from a radio frequency identification device in response to the interrogation, the response comprising disposition information and identification information associated with the item, wherein the item is an electronic device comprising a circuit pack of a node in a telecommunication network, the disposition information being obtained by the radio frequency identification device from a sensor that is operatively monitoring a signal path of the circuit pack for detecting a presence of a magnetic field, wherein the identification information comprises an identification number, the disposition information being associated with an operational state of the electronic device, wherein the operational state indicates whether the electronic device is in an installed state; and wherein, when the operational state indicates that the electronic device is in the installed state, the operational state further indicates whether the electronic device is in one of two possible states comprising: an in-use state or in a need-of-repair state.

* * * * *